(12) United States Patent
Park et al.

(10) Patent No.: US 7,881,559 B2
(45) Date of Patent: Feb. 1, 2011

(54) METHOD FOR TAKING PANORAMA MOSAIC PHOTOGRAPH WITH A PORTABLE TERMINAL

(75) Inventors: Kyoung-Ju Park, Seoul (KR); Sung-Dae Cho, Yongin-si (KR); Soo-Kyun Kim, Seoul (KR); Jae-Won Moon, Bucheon-si (KR); Nam-Ik Cho, Seoul (KR); Sang-Hwa Lee, Seoul (KR); Hyung-Il Koo, Seoul (KR); Seong-Jong Ha, Namyangju-si (KR)

(73) Assignees: Samsung Electronics Co., Ltd., Yeong Tong-Gu, Suwon-Si, Gyeonggi-Do (KR); Seoul National University Industry Foundation, Gwanak-Gu, Seoul (KR)

( * ) Notice: Subject to any disclaimer, the term of this patent is extended or adjusted under 35 U.S.C. 154(b) by 788 days.

(21) Appl. No.: 11/818,692

(22) Filed: Jun. 14, 2007

(65) Prior Publication Data

US 2008/0056612 A1     Mar. 6, 2008

(30) Foreign Application Priority Data

Sep. 4, 2006     (KR) ...................... 10-2006-0084880

(51) Int. Cl.
*G06K 9/36*     (2006.01)
*G09G 5/00*     (2006.01)
*H04N 9/74*     (2006.01)
(52) U.S. Cl. .................... 382/284; 345/629; 348/584
(58) Field of Classification Search ........................ None
See application file for complete search history.

(56) References Cited

U.S. PATENT DOCUMENTS

| 6,532,037 | B1 * | 3/2003 | Shimura ..................... 348/36 |
| 7,420,177 | B2 * | 9/2008 | Williams et al. ....... 250/370.08 |
| 7,483,590 | B2 * | 1/2009 | Nielsen et al. .............. 382/285 |
| 7,778,451 | B2 * | 8/2010 | Matsumoto ................. 382/128 |
| 2002/0181802 | A1 * | 12/2002 | Peterson ..................... 382/284 |
| 2004/0032407 | A1 * | 2/2004 | Ejiri et al. ................... 345/419 |
| 2005/0089244 | A1 * | 4/2005 | Jin et al. ..................... 382/284 |
| 2006/0238536 | A1 * | 10/2006 | Katayama et al. ........... 345/427 |

FOREIGN PATENT DOCUMENTS

| KR | 10-122093 | 9/1997 |
| KR | 2004-2682 | 1/2004 |
| KR | 2006-56050 | 5/2006 |
| KR | 2007-37049 | 4/2007 |

OTHER PUBLICATIONS

Peleg et al., Panoramic Mosaics by Manifold Projection, 1997, IEEE, pp. 338-343.*
Wei et al. A Cylindrical Virtual Space based Patadioptric Real-time Panorama Imaging System, 2006, IEEE.*

* cited by examiner

*Primary Examiner*—Anand Bhatnagar
*Assistant Examiner*—Randolph Chu
(74) *Attorney, Agent, or Firm*—Cha & Reiter, LLC

(57) ABSTRACT

A method for taking a panorama mosaic photograph includes displaying a partial image of a previously taken image as a guide image on a viewer of an image to be currently taken and taking a number of images constituting the panorama mosaic photograph according to a photography operation; projecting the taken images onto a common cylindrically curved surface; and joining the projected images into a single image.

7 Claims, 9 Drawing Sheets

(a)

(b)

(c)

(d)

(a)

(a)

TotalCost(x,y)=
MIN3{TotalCost(x-1,y-1),TotalCost(x,y-1),TotalCost(x+1,y-1)}+Cost(x,y)

Cost          TotalCost

METHOD FOR TAKING PANORAMA MOSAIC PHOTOGRAPH WITH A PORTABLE TERMINAL

CLAIM OF PRIORITY

This application claims the benefit under 35 U.S.C. §119 (a) of an application entitled "Method for Taking Panorama Mosaic Photograph with Portable Terminal," filed in the Korean Intellectual Property Office on Sep. 4, 2006 and assigned Ser. No. 2006-84880, the contents of which are hereby incorporated by reference.

BACKGROUND OF THE INVENTION

1. Field of the Invention

The present invention relates to a method for providing digital images with a portable complex device equipped with a digital photography function (e.g. a digital camera or a mobile communication terminal having a camera module), and more particularly to a method for capturing a panorama mosaic photograph.

2. Description of the Related Art

As generally known in the art, digital photography devices obtain images focused at the focus length of the lens, The view angle of the obtained images ranges between 30-50° (in the case of a conventional camera), which is less than that of human's eye view, which ranges between 150-200°. A panorama mosaic photograph is obtained by the digital camera by photographing a number of scenes and reconstructing them into a large image by connecting the senses.

In order to construct a panorama mosaic photograph, a sequence of the captures images must overlap each other. By using the overlapping regions, the images are projected/transformed onto the same planar or curved surface and connected to each other. This process is followed by what is known as a stitching process for determining the boundary between images and a blending process for rendering the luminance and feel of color of the boundary region to feel natural. As such, implementation of a panorama image requires computer vision and image processing techniques including a geometric camera projection model, feature point and correlation extraction, projection transformation matrix estimation and image transformation, image boundary region estimation, and image blending.

Although projection transformation based on camera models and geometric projection is commonly required by all mosaic algorithms, there are a number of variations on the process of estimating projection transformation and on the stitching as well as blending techniques.

In order to estimate a projection transformation matrix between images, it is necessary to extract feature points from images, find the correlation between images, and estimate the transformation matrix. The feature points extracted in this regard may be edges or corners as in the case of conventional methods. It is also possible to directly derive the correlation based on a motion estimation technique, such as a block matching. Recently developed SIFT (Scale Invariant Feature Transform) is an excellent feature point extraction technique capable of deriving the correlation and transformation relationship between images in a more accurate and stable manner. However, such feature extraction and projection transformation estimation require a large amount of calculation and floating-point operation, and are unsuitable for real-time implementation in systems with limited operation capability, such as portable terminals.

Once a transformation matrix between images is obtained, respective images are re-projected onto the same mosaic plane or curved surface. Mosaic images are commonly projected onto a cylindrically curved surface. This is because, when a panorama image is to be created, a sequence of obtained images rotate with regard to the direction of the camera and constitute a cylindrical structure. A relationship for projecting a planar (two-dimensional) image onto a cylindrically curved surface in a three-dimensional space is defined by equation (1) below.

$$\left(f\frac{X}{\sqrt{R^2-X^2}}, f\frac{Y}{\sqrt{R^2-X^2}}\right)(X,Y)\in Z^2, \quad (1)$$

wherein f refers to the focal length, and R refers to the radius of the cylindrically curved surface. In most cases, the focal length and the radius have similar values. FIG. 1 shows a process for projecting a two-dimensional image onto a cylindrically curved surface.

When projected onto the same curved surface, images overlap each other. In this regard, how to process the overlapping portions (i.e. stitching technology) is crucial to panorama mosaics. There are two types of approaches: according to the first one, two overlapping images are blended properly, and, according to the second one, the boundary of two images is determined at the overlapping portion so as to differentiate between both images. More particularly, when two images are blended according to the first approach, the values of both images, which are superimposed on the same pixel, are averaged based on a weight so as to obtain a panorama image. In this case, blurring of images occur in the overlapping region. When the boundary of images is determined in the overlapping region according to the second approach, the optimum pixel path for naturally connecting the boundary of both images is searched for. After determining the boundary of images, a blending process for alleviating rapid change in luminance and color of both images is necessary. In general, a linear transparency is defined with reference to the boundary of images so as to blend two images. In order to correct the exposure of entire images, it is also possible to blend images based on different degrees of transparency for multiple frequency bands.

As mentioned above, the conventional panorama mosaic algorithms provides an accurate projection transformation matrix by extracting feature points and corresponding points between images. For more accurate image transformation, a process for optimizing the projection transformation matrix follows. However, the conventional algorithms have a drawbacks in that, although there is no problem in dealing with the above-mentioned processes on a software basis in conventional computer environments, real-time implementation of such a mosaic process with limited hardware, such as a portable terminal, is impractical when the current system level is considered. This is because complicated floating-point operations are necessary, together with repeated operations and memories for optimization. As such, although existing panorama mosaic algorithms exhibit excellent performance on a software basis, they are hardly applicable to popular digital cameras and portable terminals.

Another drawback is that, when it comes to the feature point and correlation extraction process commonly employed by existing algorithms, the projection transformation matrix cannot be obtained from the correlation unless suitable feature points are extracted between images. This means that the panorama process cannot be proceeded at all. As such, the existing algorithms have a common limitation of instability, i.e. their panorama results vary depending on the contents of images due for panorama.

SUMMARY OF THE INVENTION

Accordingly, the present invention has been made to solve the above-mentioned problems occurring in the prior art and provides additional advantages, by providing a method of capturing panorama mosaic photograph with a portable terminal so that a panorama mosaic algorithm can be implemented in real time by the portable terminal having a digital photography function.

In accordance with an aspect, the present invention considers the limited hardware structure of portable terminals and designs an algorithm based on transformation of floating-point operations, which are required by conventional panorama mosaic algorithms, into an integer operation program. When feature points and correlations are extracted, the interaction between the panorama system and the user is used to minimize the floating-point operation process and improve the stability of the mosaic system. In addition, the user scenario regarding the panorama system is composed for best results in a conditional situation. A user interface enables the user to photograph input images in a specific manner. As such, the inventive panorama algorithm conducts a panorama creation process on an assumption that the user takes photographs in a specific manner.

In the present invention, the process for extracting feature points and correlations is omitted, and the camera system incorporates a panorama viewfinder for comparatively provide an accurate projection transformation matrix estimation. A part of the previously taken image is re-projected onto the LCD panel of the camera and seen by the user. This enables the user to obtain the next image in such a manner that it overlaps the previous image. In addition, the projection transformation matrix between consecutive images can be approximated into rotational transformation.

As such, the present invention defines a re-projection relationship based on the hardware characteristics of the camera system and the user scenario (e.g. the distance between the user and the camera lies within a predetermined range of errors). In addition, based on an assumption that the user takes images with reference to a guide image appearing on the panel to some degree, the correlation between the previous image and the currently taken image is initialized into a re-projection relationship.

The square root operation process, which is necessary for projection transformation of images, is transformed into an integer operation program, and the symmetry of images is used to reduce similar operation processes and the amount of memory utilization. During the stitching process for determining the boundary of images, a dynamic program technique is used to realize an optimum algorithm for the sake of optimization towards an integer operation process.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
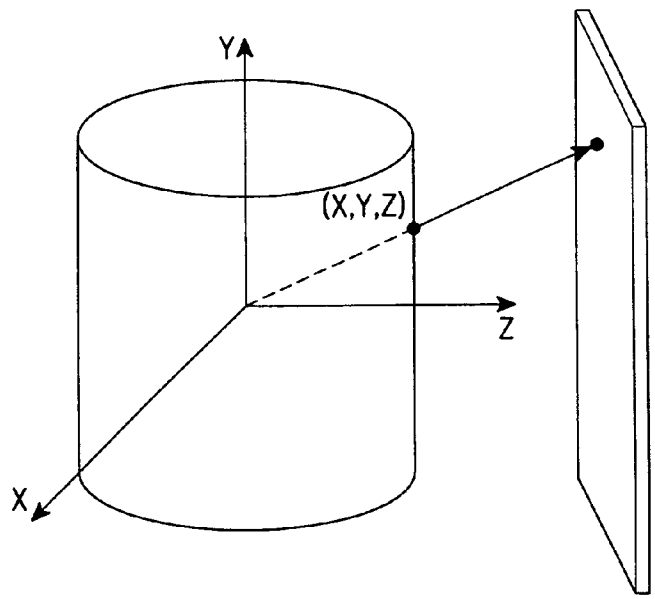
FIG. 1 shows the projection of a two-dimensional image onto a cylindrically curved surface.

Hereinafter, exemplary embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. For the purposes of clarity and simplicity, a detailed description of known functions and configurations incorporated herein will be omitted as it may make the subject matter of the present invention unclear.

Figure 2:
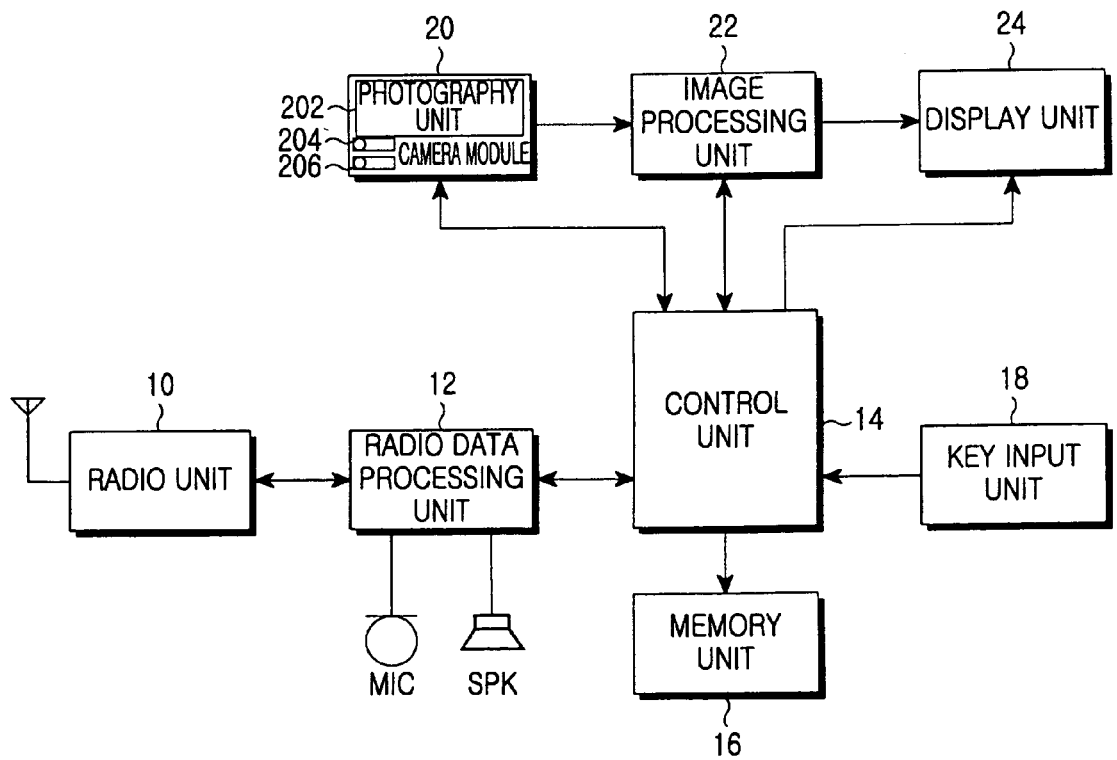
FIG. 2 is a block diagram showing the construction of a portable terminal to which the present invention is applied.

FIG. 2 is a block diagram showing the construction of a portable terminal to which the embodiment of the present invention is applied. In the following description of the present invention, it will be assumed that, among various devices incorporating a digital photography, a portable terminal is selected as an illustrative example of a hardware-based device to which the teachings of the present invention is applied, as shown in FIG. 2. According to the present invention, higher significance is given to portability as in the case of a portable terminal, rather than a conventional digital camera, and the present invention is more beneficial to devices having a narrow angle of view.

Referring to FIG. 2, the portable terminal incorporating a digital photography function, to which the present invention is applied, includes a camera module 20; an image processing unit 22; a display unit 24; a control unit 14; a memory unit 16; a key input unit 18; a radio unit 10; and a radio data processing unit 12.

In operation, the radio unit 10 modulates the user's voice, character, and control data into radio signals and transmits them to a base station (not shown) of a mobile communication network. In addition, the radio unit 10 receives radio signals from the base station, demodulates them into voice, character, and control data, and outputs them. Under the control of the control unit 14, the radio data processing unit 12 decodes voice data, which has been received from the radio unit 10, and outputs it as audible sounds via a speaker. The radio data processing unit 12 converts the user's voice signals, which are inputted from a microphone, into data and outputs it to the radio unit 10. The radio data processing unit 12 provides the control unit 14 with character and control data, which has been inputted via the radio unit 10.

The camera module 20 acts as a conventional digital camera and photographs an external object in the visible ray domain under the control of the control unit 14. The camera module 20 includes a photography unit 202 composed of a CCD image pickup device, for example, a luminance sensor 204 for measuring the luminance, and a distance sensor 206 for measuring the focal length with regard to the object to be photographed. The image processing unit 22 is adapted to process image data, which is outputted to the camera module 20, and transforms it into digital image data in a suitable format.

The key input unit 18 is adapted to receive an input of telephone numbers or characters from the user. The key input unit 18 has keys for inputting numeral and character information, as well as function keys for setting up various functions. The key input unit 18 outputs signals resulting from the user's input to the control unit 14. The display unit 24 may consist of an LCD, for example. Under the control of the control unit 14, the display unit 24 displays messages regarding various operating conditions of the terminal, as well as digital image data resulting from photography.

The control unit 14 controls the operation of the above-mentioned functional units, i.e. controls the overall operation of a mobile communication terminal. Particularly, the control unit 14 deals with signals resulting from the number input and menu selection via the key input unit 18; receives and processes external photography signals from the camera module 20; and outputs image output signals, which are necessary for various operations (e.g. photography), via the display unit 24. If necessary, the control unit 14 retrieves output contents from the memory unit 16 or stores them in the memory unit 16. The memory unit 16 stores a number of programs and data related to the operation of the control unit 14, information necessary to use the portable terminal, and information regarding images taken with the camera.

Note that the portable terminal, which is constructed as mentioned above, performs operations related to conventional mobile communication services in addition to the camera function. In addition to the above functions, the control unit 14 enables the user to take a panorama mosaic photograph according to the teachings of the present invention. To this end, the memory unit 16 stores programs required by the control unit 14 to take panorama mosaic photographs and related information, and outputs the information to the control unit 16 if necessary.

Figure 3A:
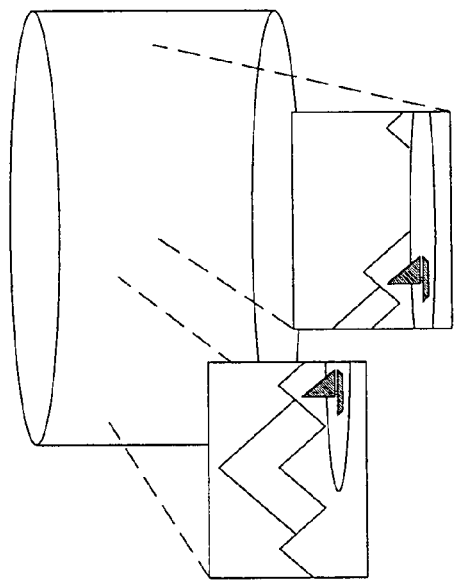
FIGS. 3a and 3b show a series of processing steps when a panorama mosaic photograph is taken according to an embodiment of the present invention.
Figure 3A:
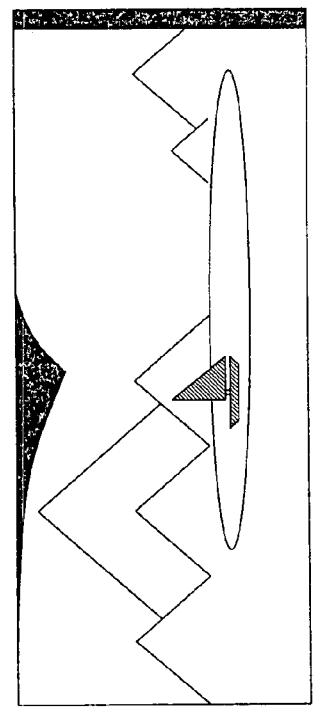
Figure 3A:
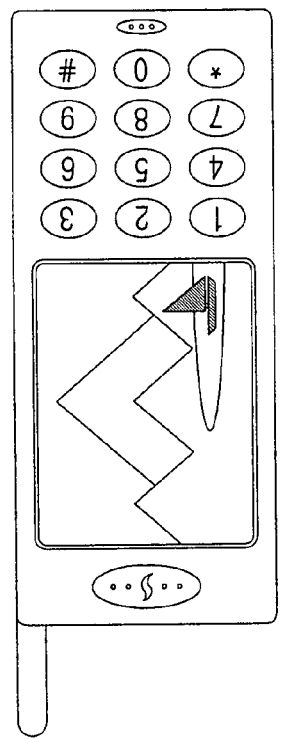
Figure 3A:
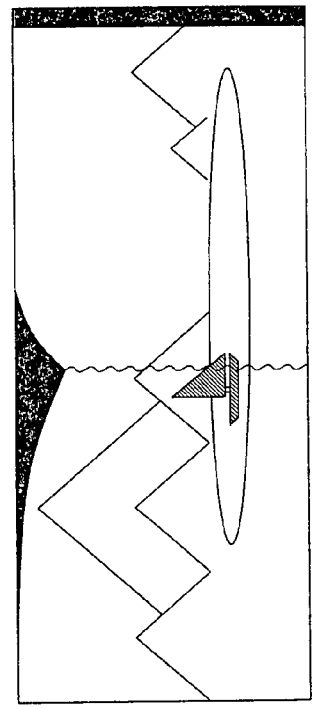
Figure 3B:
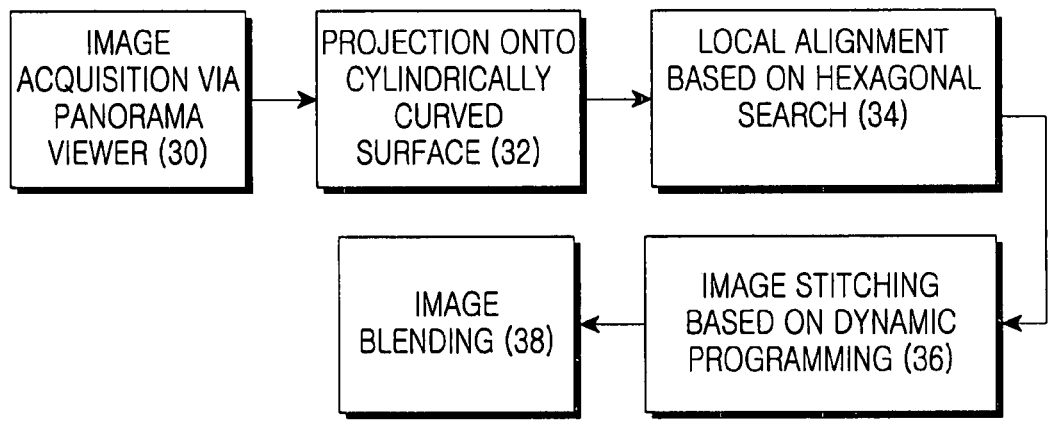

FIGS. 3a and 3b show a series of processing steps when a panorama mosaic photograph is taken according to an embodiment of the present invention. Referring to FIG. 3a, the processing steps includes the steps of (a) taking images in a panorama mode; (b) re-projecting the images onto a cylindrically curved panorama surface; (c) determining the boundary of the images; (d) and blending the images as a single image.

1) Panorama-Mode Image Taking

When images of a panorama mosaic photograph are taken, a part of the previously taken image appears on the LCD viewer as a guide image so that the user can refer to it when taking a current image. According to the user's photographing operation, a number of images are taken to constitute a panorama mosaic photograph (step 30 shown in FIG. 3b).

When a portable terminal enters into a panorama photography mode, a part of the previously taken image appears on the LCD viewer while images are taken consecutively. The user selectively positions the camera so that the part of the previous image is properly superimposed on the current image that is being taken. In this manner, images necessary for a panorama mosaic are obtained. The resulting images overlap each other as much as their parts appearing on the viewer after re-projection. This makes it possible to approximate the projection matrix between images into rotational transformation at an angle.

2) Re-Projection Onto Cylindrically Curved Panorama Surface

When images are taken in the panorama mode, it is possible to approximate the projection transformation into a rotational transformation matrix without extracting the feature of images and estimating the projection transformation between images. As a result of approximation of the projection transformation matrix, respective images are re-projected onto a common cylindrically curved surface (step 32 shown in FIG. 3b).

3) Image Boundary Determination

Images re-projected onto the cylindrically curved surface overlap each other at a predetermined portion. During a stitching process, the most natural boundary is found in the overlapping region. The present invention employs a hexagonal search technique to locally move the overlapping images and determine the optimum location (step 34 shown in FIG. 3b). Then, a dynamic programming technique is used to stitch the overlapping region and determine the boundary, which connects the overlapping images in the most natural manner (step 36 shown in FIG. 3b).

4) Image Blending

Based on the boundary region of images determined in the stitching process, any abrupt change in luminance and feel of color is removed so as to provide a single natural image (blending step). In general, a linear transparency is defined with reference to the boundary of images so as to blend two images (step 38 shown in FIG. 3b).

The above-mentioned steps when a panorama mosaic photograph is taken according to the present invention will now be described in more detail with reference to the accompanying drawings.

(1) Panorama-Mode Image Taking and Parameter Estimation

Figure 4:
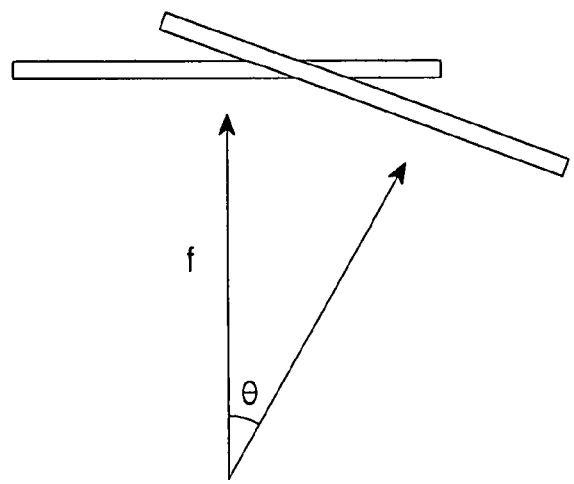
FIG. 4 shows the relationship between taken images when a panorama mosaic photograph is taken according to the present invention.

When a panorama photograph is taken, the first image is freely taken by the user. The focal length f used by the camera to obtain the first image is used to obtain all following images, which are rotated by θ with reference to the first image. The relationship between the first and second images is shown in FIG. 4.

When the center of images lies at the origin, the transformation relationship between two image coordinates can be obtained by 2D-homography, as defined by equation (2) below.

$$\begin{pmatrix} \cos\theta & 0 & f\sin\theta \\ 0 & 1 & 0 \\ -\sin\theta/f & 0 & \cos\theta \end{pmatrix} \quad (2)$$

Figure 5:
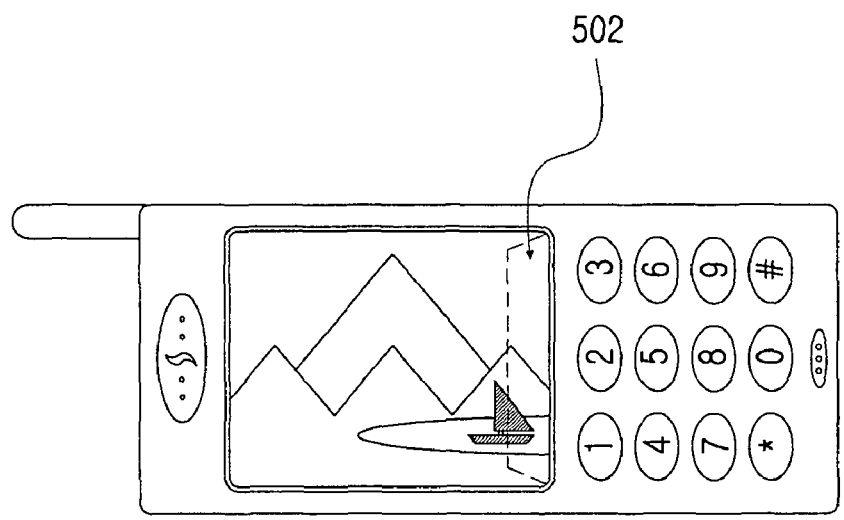
FIG. 5 shows examples of the viewer screen when a panorama mosaic photograph is taken according to the present invention.
Figure 5:
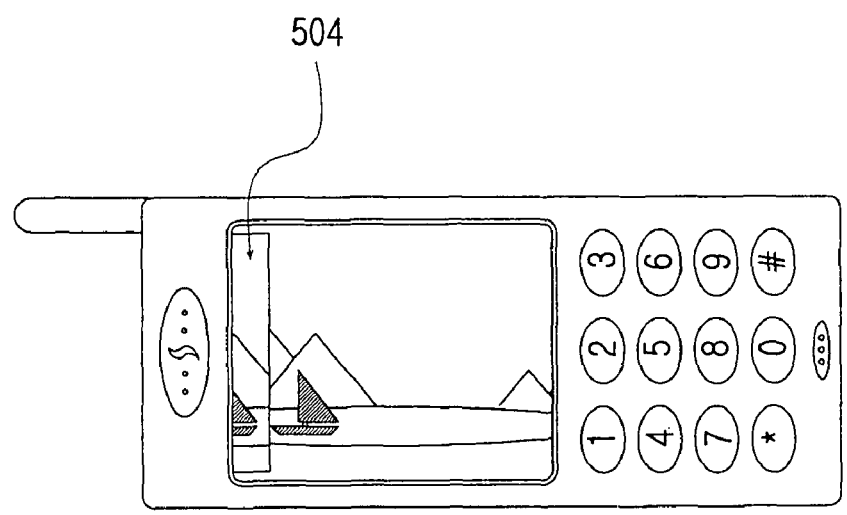

It is assumed that, when a panorama mosaic photograph is taken, respective images are rotated from left to right, as shown in FIG. 5. A part 502 of the right half of the first image is warped by using this transformation and is displayed as a guide image 504 via the viewer when the second image is taken. Then, the user matches the boundary and naturally obtains an image having a focal length of f and a rotational angle of θ. This process can be repeated freely until the estimated value of f and θ is obtained together with n images. The image re-projected onto the LCD panel (i.e. guide panel) appears semi-transparent so that the user can locate the image more accurately.

In this manner, the panorama viewer implemented according to the present invention allows omission of a number of processes adopted by conventional mosaic techniques and enables the implementation of a panorama mosaic with limited hardware. More particularly, the conventional mosaic technology estimates the projection transformation matrix between optimized images and processes the mosaic by using extracted feature points of images and estimated correlations between the feature points. However, according to the present invention, it is possible to stably derive an approximated projection transformation matrix without using these processes and complex operations involved with them. This is because an image appearing on the viewer is rotated about its horizontal axis and re-projected. By matching the image projected onto the viewer with the actual object, the transformation between the image and object is approximated into rotational transformation.

The rotational transformation matrix obtained by the viewer may be less accurate than one optimized according to the prior art. However, this level of error does not pose a serious problem, and the error may be eliminated at least partially according to a local alignment technique (described later).

In an alternate embodiment, there may be another method for transforming a part of the previous image and show it when the next image is taken: the image is projected onto a cylindrically curved surface, translated, and re-projected onto a two-dimensional (planar) view finder. The surface to be subjected to panorama is a cylindrically curved surface. The camera is rotated by θ from the current location so as to obtain an image. When the image is to be projected onto a cylindrically curved surface having a radius of R in order to paste the image, it must be projected onto a place spaced from the previously projected image by Rθ along the cylindrically curved surface. In other words, the relationship between images projected onto the curved surface simply corresponds to translation in the leftward/rightward direction. The above-mentioned method is based on this fact. What appears on the left portion of the view finder when images are taken is the right portion of the previous image. As such, according to the above-mentioned method, the previous image, which has been projected, is translated leftwards by Rθ, and the overlapping region is re-projected onto the plane.

(2) Re-Projection Onto Cylindrically Curved Panorama Mosaic Surface

In order to blend a number of images into a single image, they must be projected onto a suitable surface. The present invention employs a cylindrically curved surface. For convenience of description, a point in a three-dimensional space is denoted by (X,Y,Z), and a point of an image by (x,y). An image coordinate system refers to a coordinate system in which the center of an image lies at the origin. The width of image I is W, and its height is H. A pixel at location (x,y) is referred to as I(x,y). When (x,y) consists of integers, it indicates the exact pixel value, and, in the case of real numbers, a result of linear interpolation from four peripheral pixels is given.

Projection Into Mosaic Space

A formula for converting a three-dimensional space coordinate, P=(X,Y,Z), into a cylindrical coordinate (with a radius of R), (u,v)=(Rθ,v), is defined by equation (3) below.

$$u = R\tan^{-1}\left(\frac{x}{z}\right) \qquad (3)$$
$$v = \frac{Ry}{\sqrt{x^2+z^2}}$$

Assuming that the center of the camera lies at the center of the three-dimensional space coordinate and that the camera faces along Z-axis, the Y-axis rotation of the camera corresponds to translation on the cylindrically curved panorama surface in the horizontal direction. A point in the three-dimensional space, P=(X,Y,Z), corresponds to a point of an image and a cylindrical coordinate as defined by equation (4) below.

$$\left(f\frac{X}{Z}, f\frac{Y}{Z}\right) \leftrightarrow \left(\tan^{-1}\frac{X}{Z}, \frac{RY}{\sqrt{X^2+Z^2}}\right) \qquad (4)$$

Therefore, (x,y) on a taken image corresponds to cylindrical coordinate $$(u, v) = \left(R\tan^{-1}\frac{x}{f}, \frac{Ry}{\sqrt{f^2+x^2}}\right).$$

Inversely, a point of cylindrical coordinate (u,v)=(Rθ,v) corresponds to corresponds to $$\left(f\tan\frac{u}{R}, f\frac{v}{R\cos(u/R)}\right)$$

on the image. Therefore, point (u,v) on the cylinder becomes $$I\left(f\tan\frac{u}{R}, \frac{v}{R\cos(u/R)}\right).$$

It may be said that the manner of obtaining the result is similar to that according to the prior art. However, based on a consideration that this type of operation cannot be performed in real time with limited hardware, the present invention modifies the above-mentioned formulas in a manner described later so that an integer operation is possible. In addition, a technique for reducing the amount of calculation and memory use is proposed based on the symmetry.

Actual Implementation by the Invention

When the result of projection onto the cylinder is obtained by a back-projection method, an accurate pixel value can be obtained for any point on the cylinder, as defined by equation (5) below.

$$I\left(f\tan\frac{u}{R}, f\frac{v}{R\cos(u/R)}\right) \qquad (5)$$

However, equation (5) can hardly be implemented by a fixed-point operation alone. It is also unsuitable to use a lookup table, because f and R are not given in advance. Therefore, the present invention solves this problem by approximating equation (5) into equation (6), given below, so that it is suitable for a fixed-point operation.

$$\left(f\tan\frac{u}{R}, f\frac{v}{R\cos(u/R)}\right) = \left(f\frac{R\sin(u/R)}{R\cos(u/R)}, f\frac{v}{R\cos(u/R)}\right) \quad (6)$$

$$= \begin{pmatrix} f\dfrac{R\sin(u/R)}{\sqrt{R^2 - R^2\sin^2(u/R)}}, \\ f\dfrac{v}{\sqrt{R^2 - R^2\sin^2(u/R)}} \end{pmatrix}$$

By using approximation u≈Rsin(u/R) in equation (6), a point of cylindrical coordinate (u,v)=(Rθ,v) can be expressed as a point on the image, as defined by equation (7) below.

$$\left(f\frac{u}{\sqrt{R^2 - u^2}}, f\frac{v}{\sqrt{R^2 - u^2}}\right) \quad (7)$$

The best merit of an approximation formula, such as equation (7), is that it can be implemented with no real number operation. Particularly, a square root equation can be calculated with no real number operation. Therefore, such a formula can be implemented much more economically when no fixed-point operation is possible. Meanwhile, R is determined in such a manner that the magnification of the output image is almost identical to that of the input image, as defined in equation (8) below.

$$R = \sqrt{f^2 + \left(\frac{W}{2}\right)^2} \quad (8)$$

It is meant by obtaining an image projected onto the cylinder that the value given in equation (9) below is calculated based on an assumption that (u,v) approximately satisfies $-W/2 \leq u \leq W/2$ and $-H/2 \leq v \leq H/2$.

$$I\left(f\frac{u}{\sqrt{R^2 - u^2}}, f\frac{v}{\sqrt{R^2 - u^2}}\right) \quad (9)$$

By using a pseudo-code, this process can be summarized in Table 1 given below. In the code, value $$I\left(f\frac{u}{\sqrt{R^2 - u^2}}, f\frac{v}{\sqrt{R^2 - u^2}}\right)$$

is a result of linear interpolation based on four pixels, as mentioned above, and a fixed-point operation.

TABLE 1

Algorithm for projection onto cylinder: table of $\sqrt{R^2-u^2}$ is obtained by integer operation alone according to Bresenham-type algorithm For v=0~H/2
  For u=0~W/2
    Compute $$I\left(f\frac{u}{\sqrt{R^2 - u^2}}, f\frac{v}{\sqrt{R^2 - u^2}}\right)$$

$$I\left(f\frac{-u}{\sqrt{R^2 - u^2}}, f\frac{v}{\sqrt{R^2 - u^2}}\right)$$

$$I\left(f\frac{u}{\sqrt{R^2 - u^2}}, f\frac{-v}{\sqrt{R^2 - u^2}}\right)$$

$$I\left(f\frac{-u}{\sqrt{R^2 - u^2}}, f\frac{-v}{\sqrt{R^2 - u^2}}\right) \quad \text{using symmetry.}$$

End u
End v

Figure 6:
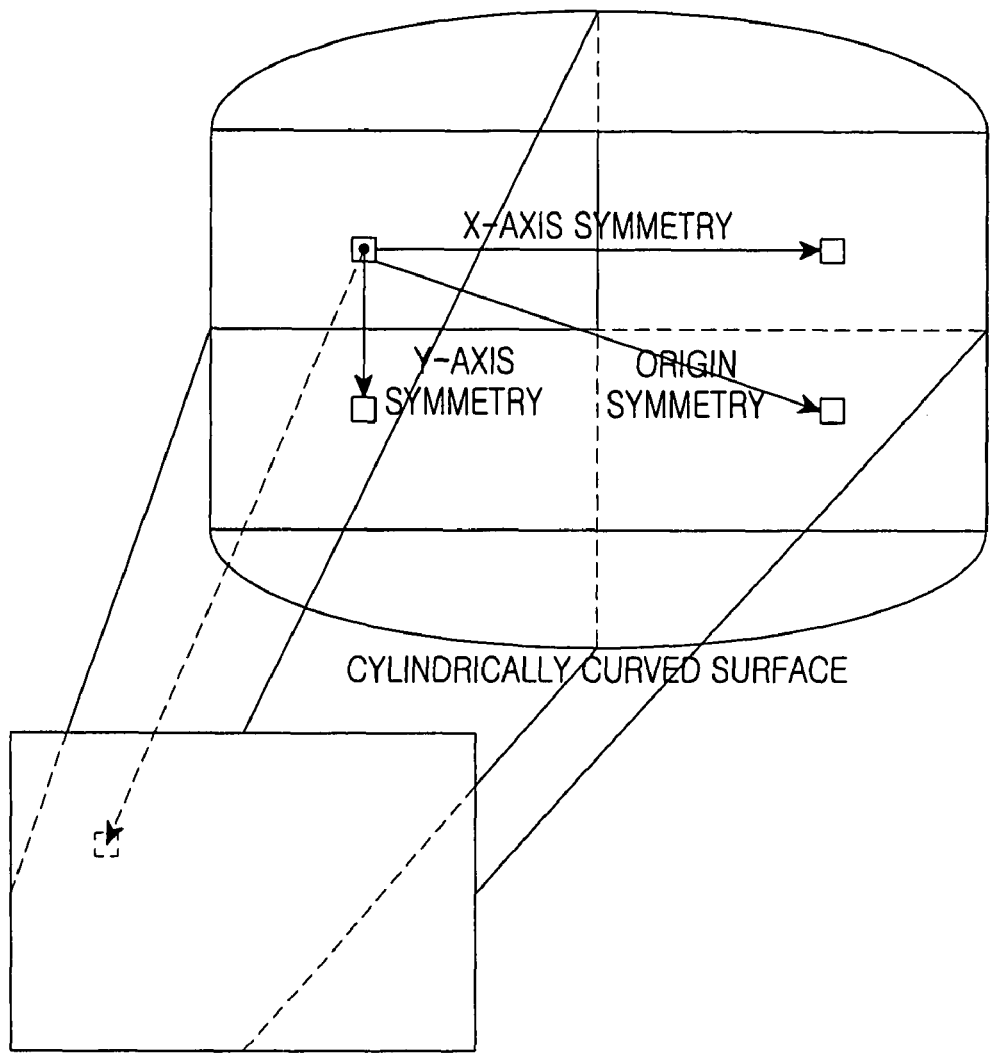
FIG. 6 shows the symmetry about the center of images projected onto a cylindrically curved surface when a panorama mosaic photograph is taken according to the present invention.

The symmetry will now be described in more detail. When the center of an image lies at the origin as shown in FIG. 6, a pixel value corresponding to (u,v) on the cylindrically curved surface undergoes the above-mentioned calculation process of $\sqrt{R^2-u^2}$ and becomes $$I\left(f\frac{u}{\sqrt{R^2 - u^2}}, f\frac{v}{\sqrt{R^2 - u^2}}\right)$$

in the two-dimensional plane. However, pixel values corresponding to (−u,v), (u,−v), and (−u,−v) become $$I\left(f\frac{-u}{\sqrt{R^2 - u^2}}, f\frac{v}{\sqrt{R^2 - u^2}}\right),$$

$$I\left(f\frac{u}{\sqrt{R^2 - u^2}}, f\frac{-v}{\sqrt{R^2 - u^2}}\right),$$

and $$I\left(f\frac{-u}{\sqrt{R^2 - u^2}}, f\frac{-v}{\sqrt{R^2 - u^2}}\right),$$

respectively, based on the y-axis symmetry, x-axis symmetry, and origin symmetry with regard to (u,v), without undergoing the calculation process of $\sqrt{R^2-u^2}$.

Figure 7:
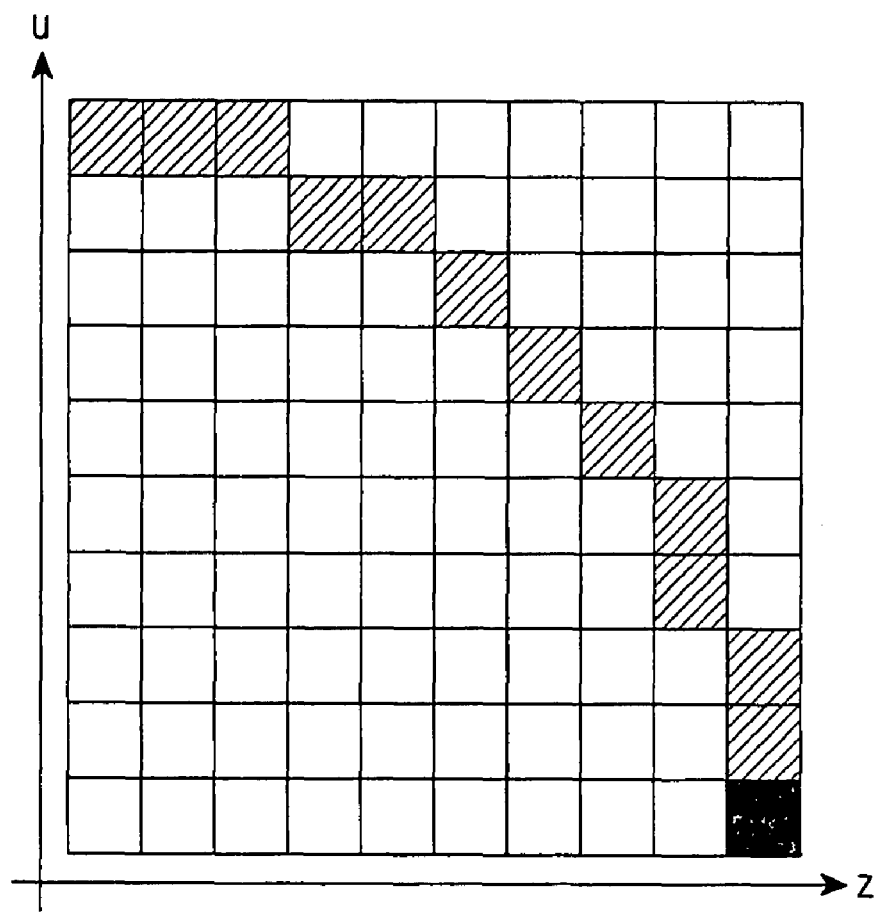
FIG. 7 conceptually shows the transformation of a square root operation into an integer operation.

A process for obtaining a table of $\sqrt{R^2-u^2}$ based on an integer operation alone will now be described briefly. When $\sqrt{R^2-u^2}=z$, squaring both sides gives $u^2+z^2=R^2$, which correspond to the equation of a circle. In general, u and z have real number values, but, in order to present a circle on the image, u and z must always be integers as shown in FIG. 7. The Bresenham-type algorithm is based on this finding, and is adopted by the present invention to obtain a square root by means of an integer operation alone.

An error function is defined as in equation (10) below.

$$\text{RadiusError}(z_i, u_i) = |z_i^2 + u_i^2 - R^2| \quad (10)$$

If u and z exist on the circle, the error function defined above has a value of 0. If u and z do not exist on the circle, the nearer to the circle they are, the closer to 0 the error function value is. Referring to FIG. 7, the value of u always increases by 1, but that of z is equal to the previous value or smaller than the previous value by 1. Based on these characteristics, values of the error function before and after z-1 substitutes for z, respectively, are compared with each other while increasing u by 1. Then, the value of z making the error function value smaller is taken. This process is summarized by using a pseudo-code as given in Table 2 below.

TABLE 2

$u_{i+1} = u_i + 1$
Compare RadiusError($z_i, u_{i+1}$) & RadiusError($z_i - 1, u_{i+1}$)
if RadiusError($z_i, u_{i+1}$) < RadiusError($z_i - 1, u_{i+1}$)
$z_{i+1} = z_i$
else $z_{i+1} = z_i - 1$ The initial value of u and that of z, i.e. $u_0$ and $z_0$, are 0 and R, respectively, which correspond to the location of the black pixel shown in FIG. 7. In order to locate the next pixel, the coordinate value corresponding to the pixel above the black pixel and that corresponding to the pixel to the left of the pixel above the black pixel are put into the error function defined above, and the resulting values are compared with each other. Particularly, $u_i$ is replaced with 1, and $z_i$ with R and R-1, respectively, so as to compare the resulting error function values. Then, $z_i$ value, when the error function value is smaller, is taken as $z_{i+1}$ value. Referring to the drawing, $z_{i+1}$ becomes R. This process is repeated until z value for every u is obtained. In this manner, without having to directly obtain the square root, u of $\sqrt{R^2-u^2}$ is simply replaced with a corresponding value to obtain the corresponding z value, i.e. $\sqrt{R^2-u^2}$.

(3) Color and Luminance Correction

Even when the same camera is used to take images, any change in the photography direction or angle varies the amount of light, and makes the luminance and feel of color of respective images different. Such a difference causes the boundary of images to appear vivid even after images are subjected to mosaic and blending processes. As a result, the entire image appears very unnatural. In order to solve this problem, the present invention adjusts the color and luminance so as to remove the difference in luminance between images.

Particularly, the difference in luminance between two images is measured with regard to the overlapping region after they overlap each other as a result of projection transformation. Pixels at the same location are compared with each other to calculate the difference in luminance. Based on the calculated luminance difference, adjustment is performed to make the luminance and color of both images similar.

According to the luminance adjustment proposed by the present invention, although images have very different degrees of luminance due to the difference in exposure, they come to have similar levels of color and luminance components. This guarantees natural mosaic blending.

Figure 8A:
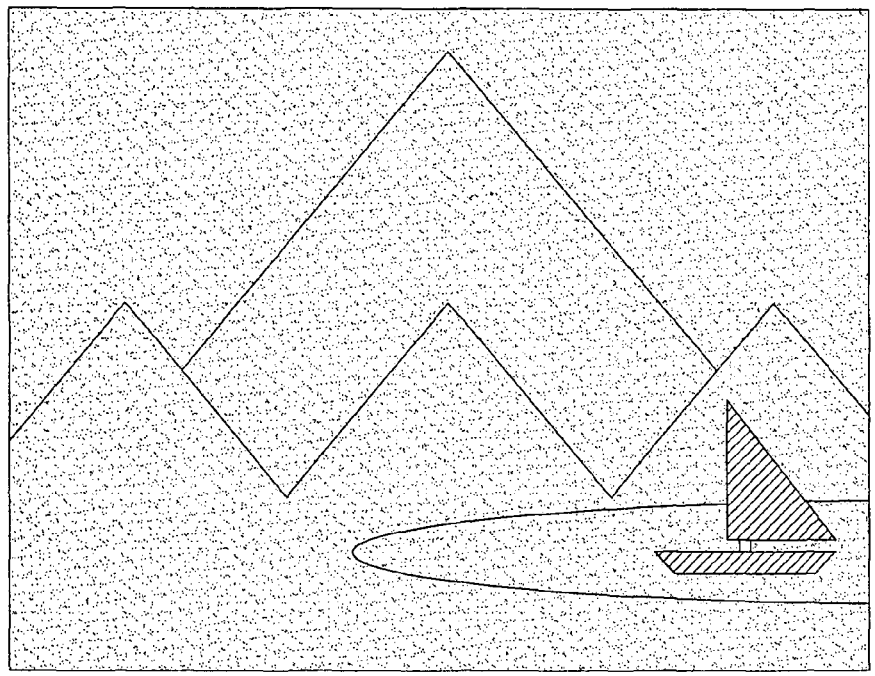
FIG. 8 shows examples of input and output images after luminance correction.
Figure 8B:
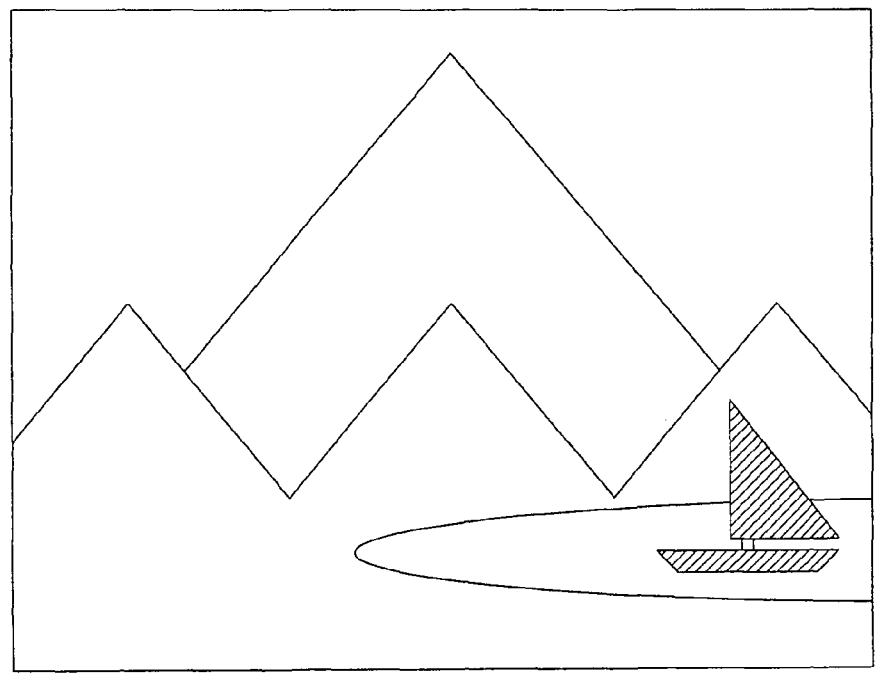

Although similar luminance adjustment is used by the prior art, the present invention is different in that the luminance is calculated and standardized for alignment. FIG. 8 shows an input image (a), the luminance of which has been adjusted, and an output image (b).

(4) Local Alignment Based on Hexagonal Search

Although a considerable degree of accuracy may be expected with regard to the focal length f, the rotational angle θ varies depending on the photography environment and user, which means that is has a considerable degree of error. Local alignment is necessary to correct this value. Furthermore, errors result not only from Y-axis rotation, but also from X-axis rotation. However, X-axis rotation generally has trivial influence, and it is enough for local alignment to translate the result of projection onto the cylinder. In order to obtain optimum local alignment results, every overlapping region between two adjacent two images must be searched. However, this takes a long time. Such a problem can be solved by a hexagonal search. It will be assumed that two adjacent images $I_1$ and $I_2$ have overlapping regions $I_1^{ov}$ and $I_2^{ov}$. It is said that, when both regions overlap each other with no discrepancy, they have moved as much as (0,0), and the corresponding cost is obtained. In this regard, the cost function is defined as: $|I_{1,(x,y)}^{ov} - I_{2,(x,y)}^{ov}|_{(x,y) \in \text{ overlapped area}}$. With regard to the location of six peripheral pixels about that location (which constitute a hexagon as a whole), only $I_2$ is moved (without moving $I_1$) so as to obtain the cost for each of them. The location of six peripheral pixels is shown in FIG. 9.

The cost for each of seven pixels is compared to find the minimum cost. If the minimum cost comes from the center, i.e. (0,0), two adjacent images are regarded in good alignment, and no search is conducted any more. If the minimum cost comes from one of the six peripheral pixels, the cost for six peripheral locations about that location is obtained again. The cost of three of the six locations has already been obtained, and their values are larger than that of the center. Therefore, the cost for newly designated three locations is obtained and compared. If the cost of the center is smaller than that of the six peripheral locations, the search stops, and the two images are aligned with reference to that location. If not, the above process is repeated until the cost of the center becomes smaller than that of six peripheral locations.

Figure 9:
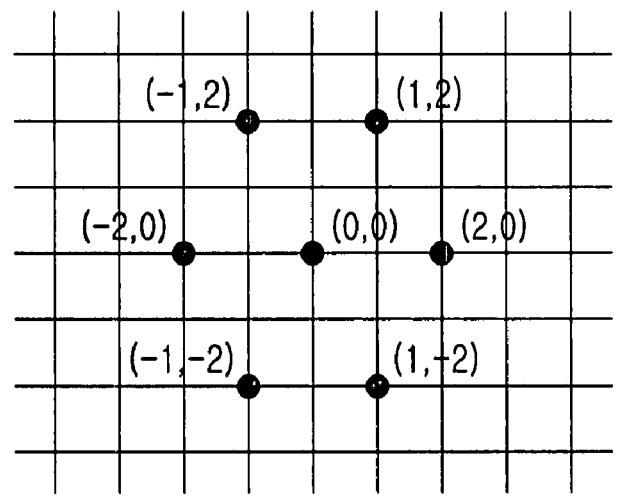
FIG. 9 shows the concept of local alignment based on a hexagonal search of images when a panorama mosaic photograph is taken according to the present invention.
Figure 9:
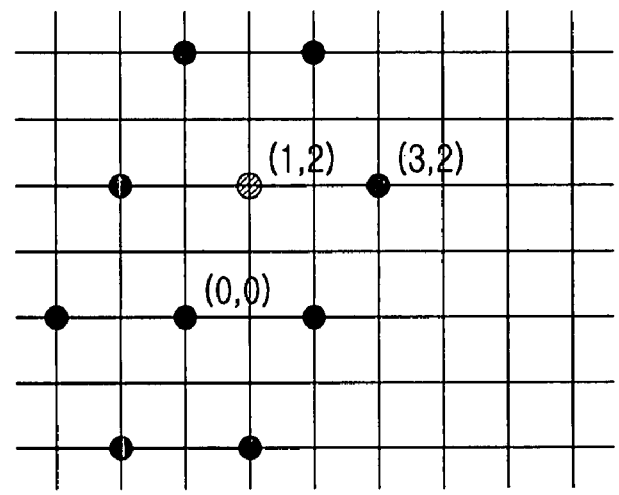

FIG. 9 shows the concept of a local alignment based on a hexagonal search. In FIG. 9, (a) shows six peripheral locations about the initial center (0,0): (1,2), (2,0), (1,-2), (-1,-2), (-2,0), and (-1,2) together with the cost calculated for each of them. In addition, (b) of FIG. 9 shows that, as a result of the cost calculation in the case of (a), the minimum cost has occurred at location (1,2), and the cost for peripheral locations about that location is calculated.

Such local alignment based on a hexagonal search is characterized in that, even though some errors may occur, the location of images can be adjusted by minimum calculation and search. In other words, based on the hexagonal search proposed by the present invention, it is not necessary to search all points in the overlapping regions, but efficient review of some of them is enough for excellent performance. In general, when the amount of calculation and the processing time are not very tight, a larger range of regions and search locations may be selected for local alignment based on a full search.

(5) Stitching Based on Dynamic Programming

The problem of finding the most natural boundary between two overlapping images can be solved by using dynamic programming. It is assumed that two images $I_1$ and $I_2$ overlap each other in regions $I_1^{ov}$ and $I_2^{ov}$, and the error surface is defined as $e=|I_1^{ov}-I_2^{ov}|$. In order to find the minimum error boundary along the vertical axis, the cumulative error is calculated with regard to a possible path. The cumulative error value E is obtained from equation (11) below.

$$E(i,j)=e(i,j)+\min(E(i-1,j-1),E(i,j-1),E(i+1,j-1)) \quad (11)$$

Then, a path having the next minimum cumulative error is searched for. The cumulative error may be solely based on the difference in luminance Y values between images. Alternatively, the differences between respective color signal components are obtained according to the color signal formats (RGB, YUV) and are combined to give the cumulative error.

Figure 10:
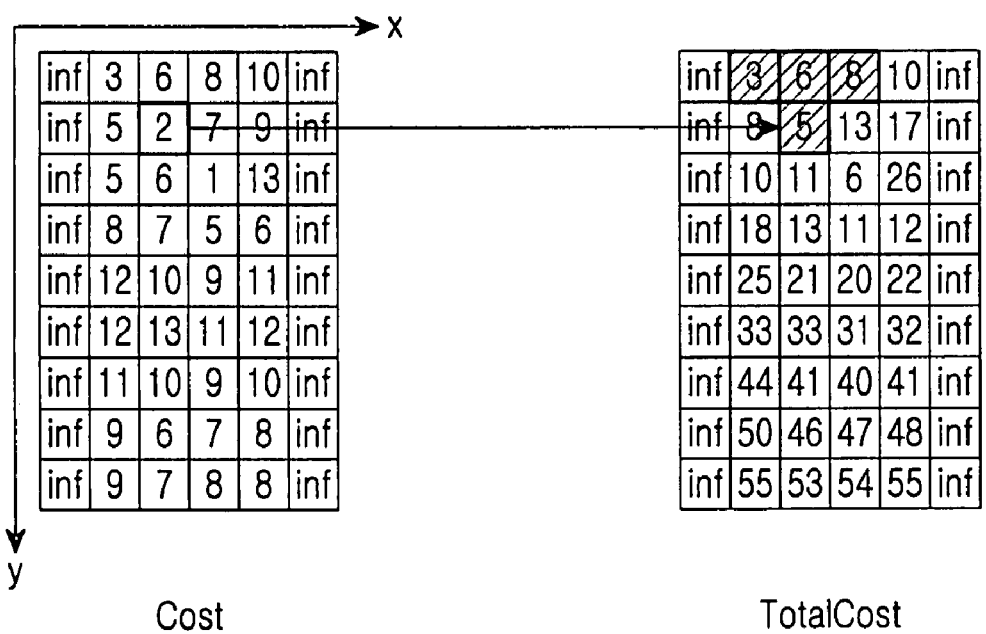
FIG. 10 shows the update of a cumulative error function between images based on dynamic programs when a panorama mosaic photograph is taken according to the present invention.

FIG. 10 shows the update process of a cumulative error function based on an initial error function and a dynamic program. In FIG. 10, the left table gives examples of initial error values obtained for respective pixels from overlapping images, and the right table gives cumulative error values obtained at respective pixel locations according to equation (11). Particularly, FIG. 10 shows how to obtain the value of E(1,1). When this is entered into the equation, e(1,1)+min((E (0,0), E(1,0), E(2,0)), which leads to 2+min(3+6+8)=5.

(6) Blending

When two images are combined, it is desirable that their boundary is made natural. To this end, "α-map" is used. Two weights α and α−1 are given to two images near the boundary, respectively, and they are linearly combined to obtain a natural boundary.

As mentioned above, the method for taking a panorama mosaic photograph according to the present invention is advantageous in that, since simple operations and limited hardware resources are enough to construct a mosaic, the method can be easily adopted by portable terminals incorporating camera systems.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for taking a panorama mosaic photograph, comprising:
   (a) displaying a partial image of a previously taken image as a guide image on a display showing a current image to be taken and taking a number of images, in sequence, constituting the panorama mosaic photograph according to a photography operation;
   (b) projecting the taken images onto a common cylindrically curved surface; and
   (c) joining the projected images into a single image, wherein
   step (b) is performed according to equation (12) below $$I\left(f\frac{u}{\sqrt{R^2-u^2}}, f\frac{v}{\sqrt{R^2-u^2}}\right) \quad (12)$$

wherein a focal length of images is f; a rotational angle between images is θ; an image coordinate system with an image center at an origin is (x,y); a width and a height of image I are W and H, respectively; a pixel at location (x,y) is I(x,y); a cylindrical coordinate with radius R is (u,v)=(Rθ,v); and (u,v) satisfies −W/2≤u≤W/2 and −H/2≤v≤H/2,
   $\sqrt{R^2-u^2}$ is calculated based on an integer operation alone using a Bresenham-type algorithm, and
   pixel values corresponding to (−u,v), (u,−v), and (−u,−v) are converted to pixel values of $$I\left(f\frac{-u}{\sqrt{R^2-u^2}}, f\frac{v}{\sqrt{R^2-u^2}}\right),$$

$$I\left(f\frac{u}{\sqrt{R^2-u^2}}, f\frac{-v}{\sqrt{R^2-u^2}}\right),$$

and $$I\left(f\frac{-u}{\sqrt{R^2-u^2}}, f\frac{-v}{\sqrt{R^2-u^2}}\right),$$

respectively, based on y-axis symmetry, x-axis symmetry, and origin symmetry with regard to (u,v).

2. The method as claimed in claim 1, wherein the radius R of the cylindrical coordinate is defined by equation (13) below $$R = \sqrt{f^2 + \left(\frac{W}{2}\right)^2}. \quad (13)$$

3. The method as claimed in claim 1, wherein, in step (a), the partial image of the previously taken image is transformed into a coordinate of the image to be currently viewed in the display.

4. The method as claimed in claim 1, wherein, in step (a), the previously taken image is projected onto the cylindrically curved surface and translated by the θ, and an overlapping region between the previously taken image and the image to be currently taken is re-projected onto a planar surface and displayed as the guide image.

5. The method as claimed in claim 1, wherein, when the images are projected onto the cylindrically curved surface, a luminance difference is detected with regard to an overlapping region between the images so that the images are adjusted to have an identical luminance.

6. The method as claimed in claim 1, wherein step (c) comprises a aligning step, a stitching step, and a blending step.

7. The method as claimed in claim 6, wherein, in the aligning step, a hexagonal search technique is used to determine an alignment condition by obtaining a cost of an overlapping region between two images according to cost function $|I_{1,(x,y)}{}^{ov}-I_{2,(x,y)}{}^{ov}|_{(x,y)\in\ overlapped\ area}$ when two adjacent images $I_1$ and $I_2$ overlap each other in regions $I_1{}^{ov}$ and $I_2{}^{ov}$ and when an error surface is $e=|I_1{}^{ov}-I_2{}^{ov}|$, moving $I_1$ or $I_2$ with regard to locations of six peripheral pixels at a predetermined distance from current location (0,0) so as to obtain a cost for each case, and finding a minimum cost, and, in the stitching step, a dynamic program is used to obtain cumulative error E with regard to an overlapping region between two aligned images according to E(i, j)=e(i, j)+min(E(i−1,j−1), E(i,j−1), E(i+1,j−1)) and find a path having a smallest cumulative error.

* * * * *